United States Patent [19]

Smith et al.

[11] Patent Number: 4,831,238
[45] Date of Patent: May 16, 1989

[54] HIGH VOLUME FORCED CONVECTION TUNNEL OVEN

[75] Inventors: Donald P. Smith; William W. Plumb, both of Dallas; Jarald E. High, Grand Prairie, all of Tex.

[73] Assignee: Donald P. Smith, Dallas, Tex.

[21] Appl. No.: 54,748

[22] Filed: May 27, 1987

Related U.S. Application Data

[63] Continuation of Ser. No. 787,524, Oct. 15, 1985, abandoned.

[51] Int. Cl.⁴ .......................... F27D 7/04; F27B 9/10
[52] U.S. Cl. ............................... 219/400; 219/388; 126/21 A
[58] Field of Search .................. 219/400, 388, 401; 126/21 A, 21 R; 34/191, 212, 222, 216, 229

[56] References Cited

U.S. PATENT DOCUMENTS

| 1,291,891 | 1/1919 | Horst | 34/191 |
|---|---|---|---|
| 1,892,319 | 12/1932 | Roth | 34/191 |
| 3,222,800 | 12/1965 | Siegel | 34/212 |
| 3,774,008 | 11/1973 | Maniscalco | 219/401 |
| 3,884,213 | 5/1975 | Smith | 126/21 A |
| 4,154,861 | 5/1979 | Smith | 219/400 |
| 4,409,453 | 10/1983 | Smith | 219/400 |
| 4,430,541 | 2/1984 | Day | 219/10.55 R |
| 4,462,383 | 7/1984 | Henke | 219/388 |
| 4,474,498 | 10/1984 | Smith | 432/144 |
| 4,479,776 | 10/1984 | Smith | 432/144 |
| 4,492,839 | 1/1985 | Smith | 126/21 A |
| 4,498,250 | 2/1985 | Gageur | 34/229 |
| 4,523,391 | 6/1985 | Smith | 34/225 |
| 4,679,542 | 7/1987 | Smith | 126/21 A |

FOREIGN PATENT DOCUMENTS 388165 8/1908 France ........................... 34/191

Primary Examiner—Teresa J. Walberg
Attorney, Agent, or Firm—Crutsinger & Booth

[57] ABSTRACT

The tunnel oven generally includes a plurality of spaced cooking compartments through which a conveyor transports food products. An air distribution chamber is formed in an upper portion of each cooking chamber and is vertically spaced from the conveyor. A blower draws air from the cooking compartment and discharges air into the air distribution chamber in a plane generally parallel to the plane of the conveyor. A pair of plenums in the cabinet adjacent one edge of the conveyor deliver air from the distribution chamber to a plurality of air dispensing ducts communicating with the plenums on opposite sides of the conveyor for dispensing air onto opposite sides of the conveyor.

18 Claims, 4 Drawing Sheets

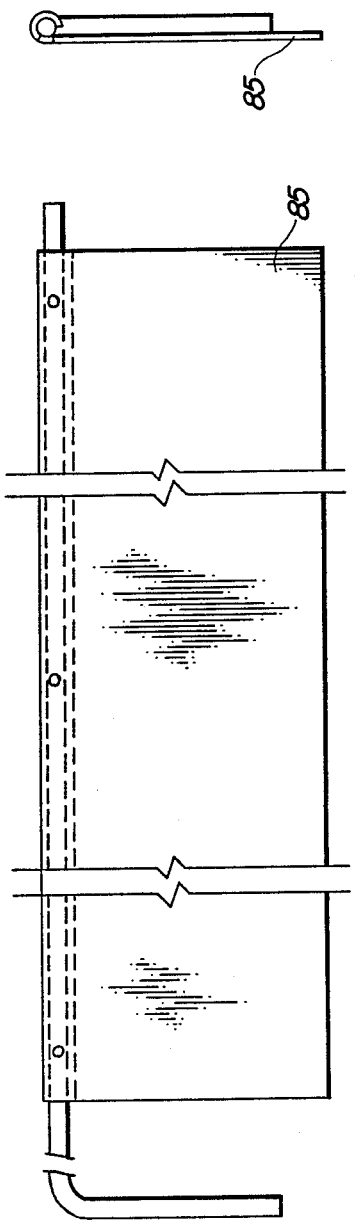

HIGH VOLUME FORCED CONVECTION TUNNEL OVEN

CROSS REFERENCE TO RELATED APPLICATIONS

This application is a continuation-in-part of application Ser. No. 06/787,524 filed Oct. 15, 1985 entitled "OVEN HUMIDITY RESERVOIR" now abandoned.

FIELD OF THE INVENTION

The invention relates to a method and apparatus for transferring heat to or from food products and is particularly adapted to commercial food processing applications.

BACKGROUND OF THE INVENTION

Cooking apparatus of the type disclosed in U.S. Pat. No. 3,884,213 directed jets of temperature controlled gaseous fluids to irregular shaped food products to subject discrete area of the surface of the food product to a very high heat transfer rate. The areas subjected to the high heat transfer rate were moved over the surface of the product to obtain desired overall surface effects such as crisping, browning, searing or freezing, depending upon the temperature of the jets of gaseous fluid and the rate of movement of the jets across the surface of the food product.

U.S. Pat. No. 4,474,498 discloses a generally vertically disposed plenum extending along the back wall of an oven compartment, the compartment being divided into a plurality of horizontally spaced chambers and having a pair of conveyors moving therethrough, one above the other such that a food product was moved through the heating compartment by a conveyor making more than one pass through the compartment for controlling heat transferred to the product.

U.S. Pat. Nos. 4,154,861, 4,479,776 and 4,492,839 disclose a variety of fan, plenum and air dispensing devices to precisely control heat transfer to upper and lower surfaces of food products. The food products have been carried on a conveyor through tunnel ovens having air dispensing devices above and below the conveyor for top and bottom heat transfer to the food product.

The apparatus disclosed in the aforementioned patents generally incorporated a blower mounted either above or below a conveyor such that air impinging against the surface of the food product on the opposite side of the conveyor from the fan circulated partially through the conveyor and between air dispensing fingers to return to the suction side of the fan. However, when high air flows are applied or when the conveyor is completely covered by rectangular shaped pans or consists of a solid conveying band, the recirculating air had to pass beside the conveyor to return to the intake of the fan.

U.S. Pat. No. 4,523,391 disclosed a plenum having a plurality of inwardly inclined front wall panels adapted to direct the flow of air through an elongated plenum outlet port to air dispensing ducts positioned above and below a conveyor. Return ducts and the plenum were formed in a side of the housing adjacent one side of the conveyor permitting the flow of air generally transversely of the conveyor to return to the suction side of the fan.

The rate of air flow through ovens of the type hereinbefore described and disclosed in the aforementioned patents were somewhat limited by design considerations required to circulate air through the compartment without interfering with air streams employed for transferring heat to the surface of the food product carried by the conveyor. In certain applications difficulty was encountered in precisely controlling the rate of heat transfer to upper and lower surfaces of the food products since the devices relied primarily upon the volume of air delivered through ducts above and below the conveyor for transferring heat to upper and lower surfaces of the food product. The number of ducts was increased or decreased for adjusting the ratio of heat transferred to upper and lower surfaces of the food product.

SUMMARY OF INVENTION

The apparatus disclosed herein incorporates certain features including a blower positioned either above or below a cooking chamber for delivering air through a common plenum for delivering air to spaced ducts having gates mounted thereto adjacent each of the dispensing ducts for controlling the volume of air delivered into each air dispensing duct. Thus, the rate at which heat is transferred to a food product by air delivered through each duct is controllable and the flow of air through the various ducts is independently adjustable relative to the flow of air through each of the other ducts.

The blower unit is preferably positioned either above or below the conveyor to minimize the floor space occupied by the cooking apparatus. Air from the conveyor is delivered through a plenum extending generally vertically through the cooking compartment and delivering air to air dispensing ducts above and below the conveyor, gates being provided for adjusting air flow to each dispensing duct.

Sufficient space is provided in the housing between the wall of the housing and the conveyor to permit rapid return of air dispensed onto the surface of the food product on the opposite side of the conveyor from the intake of the blower along a path extending generally vertically through the housing.

The tunnel oven generally comprises a plurality of spaced cooking compartments through which a conveyor transports food products. An air distribution chamber is formed in each cooking chamber and is vertically spaced from the conveyor. A blower draws air from the cooking compartment and discharges air into the air distribution chamber in a plane generally parallel to the plane of the conveyor. A pair of plenums in the cabinet adjacent one edge of the conveyor deliver air from the distribution chamber to a plurality of air dispensing ducts communicating with the plenums on opposite sides of the conveyor or dispensing air onto opposite sides of the conveyor. The conveyor is spaced from walls of the cooking compartment a distance sufficient to permit passage of air adjacent the edge of the conveyor enroute to the blower without interfering with flow of air from the air dispensing ducts toward the conveyor.

The dispensing ducts have openings formed therein through which air is dispensed onto the conveyor. The area of the openings in the dispensing ducts is equal to more than 6% of the area of the conveyor upon which air is dispensed from each duct. A gate is adapted and positioned to adjust air flow from the distribution chamber into the plenums.

The plenums are formed by spaced walls extending longitudinally of the cabinet adjacent one edge of the conveyor. Air flow sensors in each of the plenums provide indicia indicative of air flow through each plenum.

Hangers are provided in each cooking compartment to adjust the position of the dispensing ducts relative to the conveyor.

DESCRIPTION OF DRAWING

Drawings of a preferred embodiment of the invention are annexed hereto so that the invention may be better and more fully understood, in which:

FIG. 4 is a front elevational view of a gate to be mounted in the plenum for controlling air flow to an individual air dispensing duct; and FIG. 5 is a side elevational view of the gate illustrated in FIG. 4.

Numeral references are employed to designate like parts throughout the various figures of the drawing.

DESCRIPTION OF A PREFERRED EMBODIMENT

Figure 1:
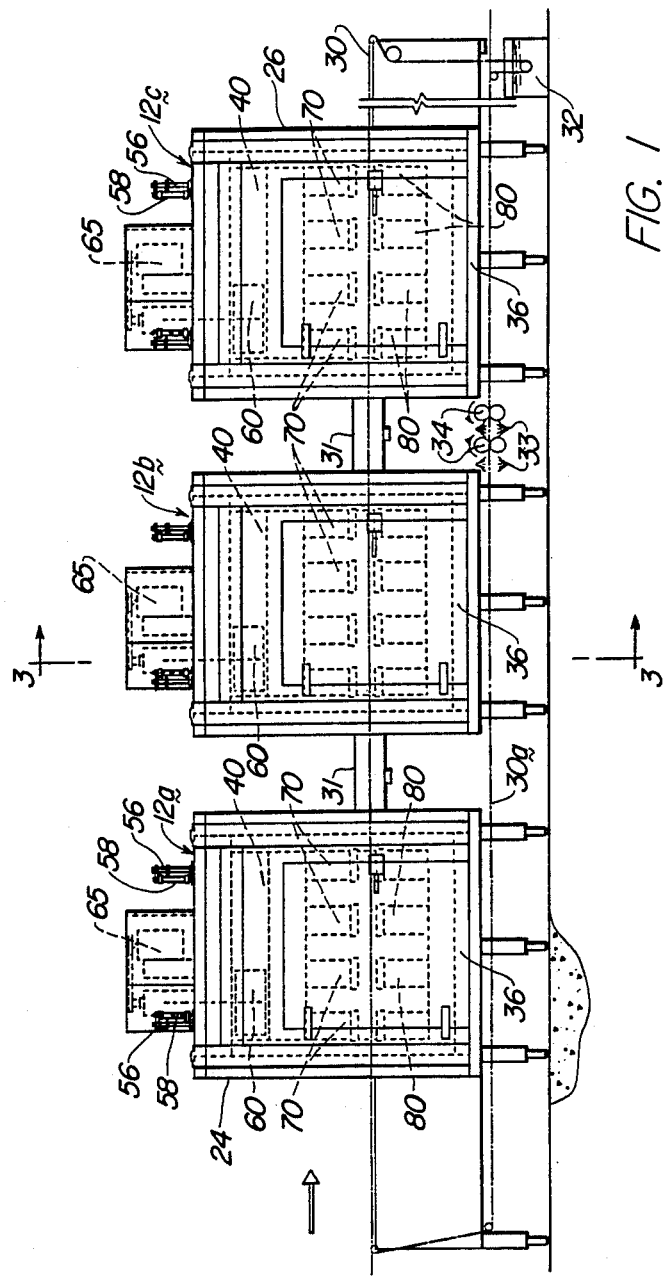
FIG. 1 is a front elevational view of the high volume forced convection tunnel oven.
Figure 2:
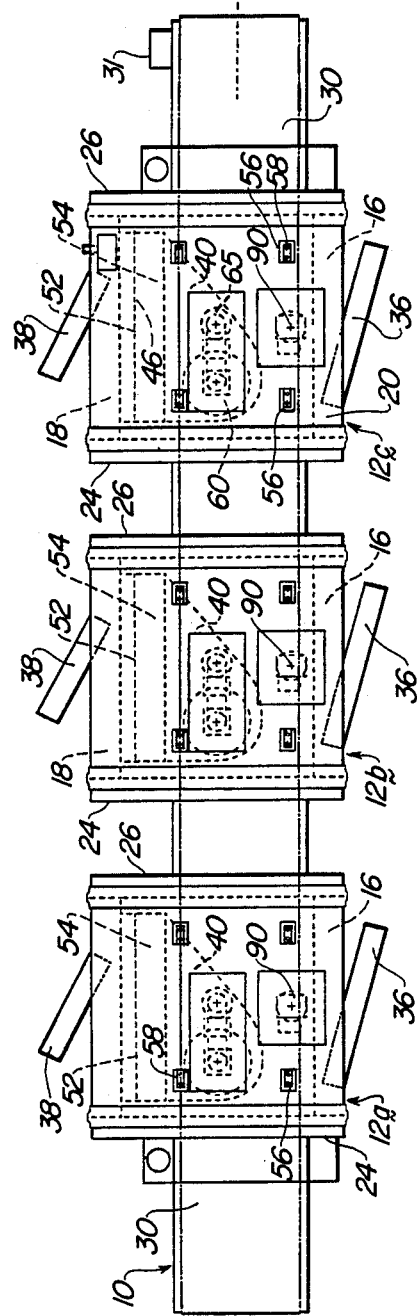
FIG. 2 is a top plan view thereof.
Figure 3:
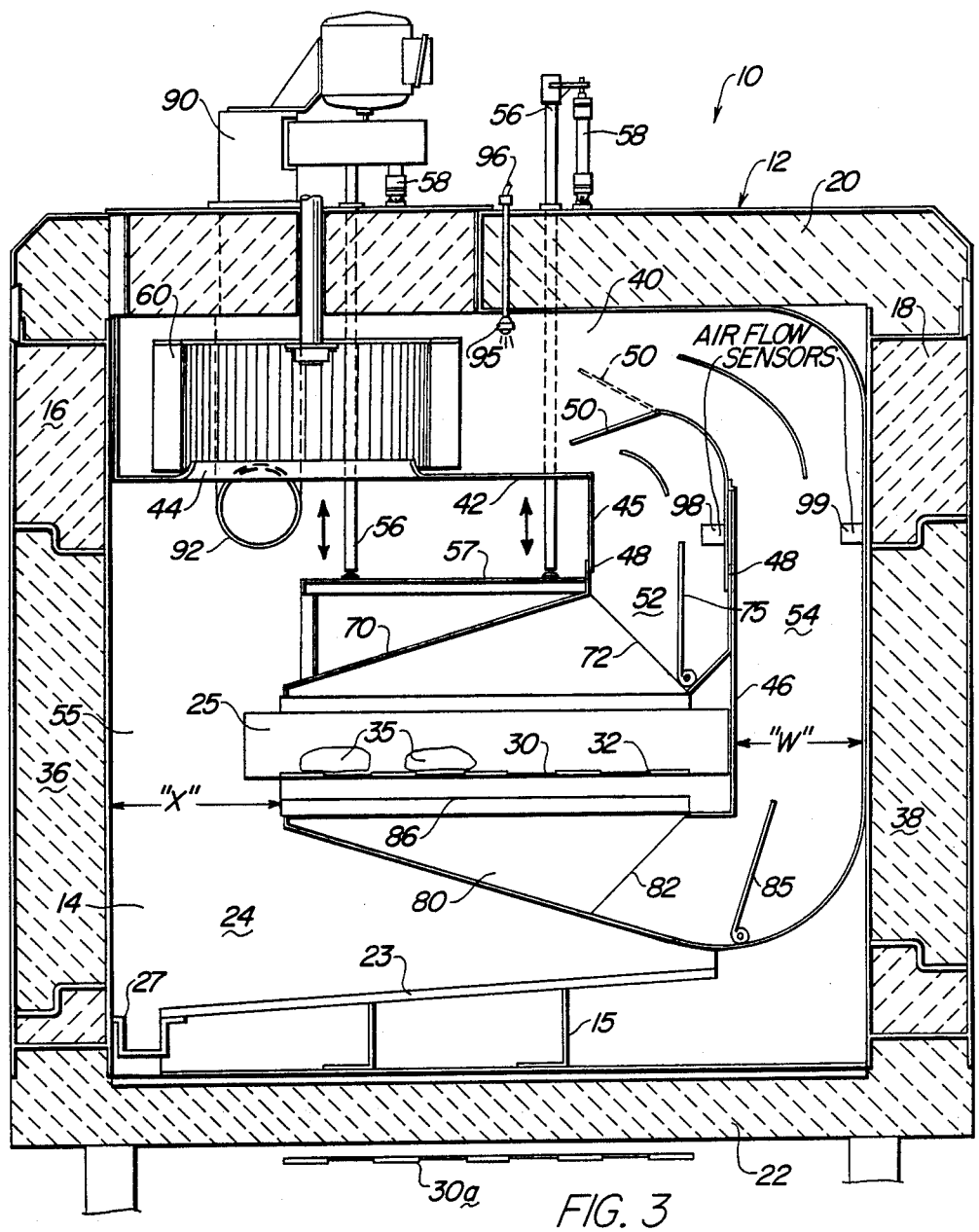
FIG. 3 is a cross-sectional view taken along line 3—3 of FIG. 1.

A preferred embodiment of the high volume force convection tunnel oven is generally designated by the numeral 10 in FIGS. 1 and 2 of the drawing. Cooking apparatus 10 generally comprises a a plurality of spaced cabinets 12a, 12b, and 12c. As illustrated in FIGS. 2 and 3, each cabinet 12 has a cooking chamber 14 therein defined between front wall 16, back wall 18, top 20, bottom 22 and spaced end walls 24 and 26. A conveyor 30 transports food products 35 through an inlet opening 25 and an exit opening 27 in each cabinet 12. Conveyor 30 preferably comprises a wire mesh conveyor belt which is routed as illustrated in FIGS. 1 and 3 of the drawing to form an upper flight extending through the cabinet and a lower flight 30a which extends below the floor or bottom wall 22 of each cabinet 12. As illustrated in FIG. 2, a variable speed drive motor 31 positioned adjacent the discharge end of the conveyor rotates conveyor 30 at a controlled speed. Conveyor 30 is routed around suitable idler drums and preferably moves through a cleaning drum 32, adjacent belt cleaning spray nozzles 33 and cleaning brushes 34 for maintaining conveyor 30 in a clean sanitary condition.

A false bottom 23 is supported by legs 25 in an inclined position, as illustrated in FIG. 3, above bottom wall 22 of the cabinet such that any drippings or liquid used for cleaning the compartment will be directed into a gutter 27 which is connected to a suitable drain for disposal of drippings and cleaning solutions.

Front wall 16 is provided with a door 36 while back wall 18 is provided with a door 38.

A generally horizontally disposed distribution chamber 40 is formed adjacent top 20 of the cabinet 12. Chamber 40 is formed between a generally horizontally disposed wall 42 having an air intake opening 44 formed therein and top wall 20 of the cabinet.

Two generally vertically disposed plenums 52 and 54 are formed adjacent back wall 18 of the cabinet, a first plenum 52 being formed between vertical walls 45 and 46 and a second plenum 54 being formed between vertical wall 46 and the back wall 18 of the cabinet. A gate 50 is pivotally secured adjacent the upper end of the central vertical wall 46 between the first plenum 52 and the second plenum 54 and is movable from the position illustrated in full outline in FIG. 3 to the position illustrated in dashed outline for adjusting air flow from distribution chamber 40 through the vertically disposed plenums 52 and 54.

As best illustrated in FIGS. 2 and 3 of the drawing, upper fingers 70 are suspended from vertically movable hanger members such as rods 56 having lower ends secured to a generally rectangular shaped frame 57 secured to each of the upper fingers 70. Each hanger 56 is moved vertically by suitable elevating means such as hydraulically actuated cylinders 58. In the embodiment illustrated in FIG. 2 of the drawing, four cyliders 58 are connected through a manifold to a source of pressurized fluid, not shown, such that each cylinder 58 is simultaneously energized for adjusting the elevation of each finger 70 relative to conveyor 30. As best illustrated in FIG. 3, the central plenum wall 46 and the front plenum wall 45 each has a sliding joint 48 formed therein permitting adjustment of the elevation of the array of upper dispensing ducts 70 relative to upper chamber 40.

A fan or blower 60 is rotatably disposed in chamber 30 and is driven by a variable speed blower motor 65 mounted on top wall 20.

A plurality of horizontally spaced upper air dispensing ducts 70 are secured to spaced openings 72 which communicate with the interior of plenum 52 for dispensing air delivered through plenum 52 onto the upper surface of food products 35 carried by conveyor 40. A plurality of lower plenums 80 are spaced longitudinally of cooking compartment 24 and communicate with openings 82 in wall 46 of plenum 54 such that air flowing through plenum 54 enters lower dispensing ducts 80 and is dispensed onto the lower surface of food products 35 carried on conveyor 30.

Dampers 75 and 85 are preferably adjustably positioned adjacent openings 72 and 82 communicating with plenums 52 and 54 to provide independent adjustment of air flow through each of the spaced upper dispensing ducts 70 relative to each of the other upper dispensing ducts and to provide adjustment of flow from each of the lower dispensing ducts relative to each of the other lower dispensing ducts. Gate 50 and dampers 75 and 85 are of substantially identical construction, except that dampers 75 and 85 are shorter. For example, if the spacing between interior end walls 24 and 26 is six feet, gate 50 is approximately six feet long, while dampers 75 and 85 may be only six inches long. It should be readily apparent that gate 50 can be manipulated for adjusting flow of air from chamber 40 to plenums 52 and 54 while dampers 75 and 85 can be manipulated for adjusting flow through individual ducts 70 and 80 for precisely adjusting the sequence and intensity of heat transfer to upper and lower surfaces of food product 35.

A conventional air heating element such as gas fire heated 90 delivers heater air through supply duct 90 into cooking compartment 14 in each cabinet 12. The heated air is preferably dispensed adjacent the intake opening of blower 60.

For control of the humidity of recirculated air, a humidifier is provided. In the disclosed embodiment a steam spray nozzle 95 is connected through a steam line 96 to a suitable source of steam (not illustrated). The dispensing of steam through nozzle 95 into air distribution chamber 40 may be controlled manually or by a humidistat for automatic control of the relative humidity of air circulating through the system.

A pair of air flow sensors 98 and 99 are mounted in plenums 52 and 54, respectively to indicate the pressure or flow rate of air through ducts 52 and 54 to provide a visual indication of the relative flow rates of air through plenums 52 and 54. The flow rate through the plenums can be adjusted by manipulating gate 50 as hereinbefore explained.

As best illustrated in FIG. 3 of the drawing, the edge 32 of conveyor 30 is spaced a distance "X" from front wall 16 of cabinet 12. If the sum of the areas of openings 86 in lower dispensing duct 80 through which air is supplied to the bottom surface of food product 35 is more than 6% of the effective area of the product or conveyor 30 being heated, the dimension designated "X" should be sufficient to permit the escape of spent air and should be larger than the area of openings 86. Finger 70 and 80 are preferably relatively narrow ducts extending across the width of conveyor 30 and deliver a volume of air such that the total volume of air in cooking compartment 14 is recirculated at least once every two seconds or less.

In the embodiment of the invention illustrated in FIG. 3 of the drawing, plenum 54 delivering air through lower dispensing ducts 80 to the lower surface of conveyor 30 is more than 10% of the width of conveyor 30 so that air can be supplied through openings 86 which are more than 6% of the effective area of conveyor 30 or product 35 swept by the air. The width "W" of plenum 54 through which air is delivered to lower dispensing ducts 80 is preferably at least three times the effective area of openings 86 in duct 80.

The return space 55 having a width "X" for spent air on the side of conveyor 30 away from plenums 52 and 54 must be more than 10% of the width of conveyor 30. The return space 55 is preferably 20% or more of the conveyor width in order to give maximum air flow from air supply openings 86 in lower ducts 80. Thirty percent or more is preferable. Thus, for a four foot wide conveyor 30, with air supply openings 86 in lower ducts 80 equalling 10% of the area of conveyor 30, the return space 55 preferably has a width "X" of at least 14 inches.

It should be readily apparent that the cabinet illustrated in FIG. 3 of the drawing may be inverted if it is deemed expedient to position blower 60 at the bottom of the compartment.

In the embodiment illustrated in FIG. 3 of the drawing wherein blower 60 is located in the upper portion of cabinet 12, air is delivered through chamber 40 in a plane generally parallel to the surface of conveyor 30. When this air is turned 90° at gate 50 into plenums 52 and 54, the air is advantageously spread through the length of each plenum in a direction generally longitudinally of back wall 18. Thus, air pressure adjacent dampers 75 and 85 is fairly uniform. Flow into each dispensing duct 70 and 80 is precisely controllable by dampers 75 and 85.

The spaced cabinets 12a, 12b and 12c are joined by generally rectangular shaped hollow tubular bridge sections 31, as illustrated in FIG. 1 of the drawing. As hereinbefore described, conveyor 30 extends through openings in end walls 24 and 26 of each compartment and through tubular bridge members 31. The air distribution chamber 40 is spaced vertically from conveyor 30. Each blower 60 in the individual cabinets draws air from the cooking compartment in the respective cabinet and discharges the air into the distribution chamber in a plane generally parallel to the plane of conveyor 30.

It should be readily apparent that plenums 52 and 54 are adjacent the rear edge of conveyor 30 in the illustrated embodiment and that upper air ducts 70 and lower air ducts 80 communicate with the respective plenums and dispense air onto opposite sides of conveyor 30. The edge of conveyor 30 adjacent front wall 16 of the cabinet is spaced a distance indicated by "X" from front wall 16 to permit passage of air adjacent the front edge of the conveyor enroute to the blower 60 without interfering with flow of air from air dispensing ducts 70 and 80 toward the conveyor 30.

Air flow sensors 98 and 99 indicate the volume of air flowing through plenums 52 and 54. Gate 50 can be adjusted to adjust the air flow through the respective plenums while dampers 75 and 85 are adjustable for adjusting the air flow to individual distribution ducts 70 and 80.

It should be appreciated that other and further embodiments of the invention may be devised without departing from the basic concept thereof.

The inventon having been described, what is claimed is:

1. A tunnel oven comprising: a cooking compartment; means to control temperature of air in said compartment; said walls on said cooking compartment; a conveyor having edges and upper and lower surfaces, said upper surface lying in a plane in said cooking compartment, said conveyor being adapted to transport food through said compartment; an air distribution chamber spaced from said conveyor; blower means adapted to draw air from said cooking compartment and to discharge air into said air distribution chamber in a plane generally parallel to the plane of said conveyor; first and second plenums in said cooking compartment adjacent one edge of said conveyor; a gate adapted to divide air flow from said distribution chamber into said first and second plenums; a plurality of air dispensing ducts having air dispensing openings communicating with said plenums on opposite sides of said conveyor for dispensing air toward said upper and lower surfaces of said conveyor, said conveyor being spaced from walls of said cooking compartment a distance sufficient to permit passage of air adjacent an edge of the conveyor en route to said blower without interfering with flow of air from said air dispensing ducts toward said conveyor.

2. A tunnel oven according to claim 1, the sum of the areas of said air dispensing openings in said dispensing ducts being equal to more than 6% of the area of the conveyor upon which air is dispensed from each duct.

3. A tunnel oven according to claim 1, wherein said first and second plenums are formed by spaced walls extending longitudinally of said cabinet adjacent one edge of said conveyor.

4. A tunnel oven according to claim 1, with the addition of air flow sensor means in each of said first and second plenums providing indicia indicative of air flow through each plenum.

5. A tunnel according to claim 4, with the addition of damper pivotally secured in said plenum adapted to adjust air flow into each air dispensing duct from said first and second plenums.

6. A tunnel oven according to claim 1, with the addition of: hanger means in said cooking compartment; means securing said hanger means to said air dispensing ducts; and means to move said hanger means to adjust the position of said dispensing ducts relative to said conveyor.

7. A tunnel oven according to claim 1, with the addition of: means to control humidity of air in said cooking compartment.

8. A tunnel oven according to claim 1, with the addition of: a plurality of cooking compartments; means routing said conveyor sequentially through each of said cooking compartments.

9. A tunnel oven according to claim 1 in which the space "X" between the edge of the conveyor and the side wall of the oven is at least 12% of the width of the conveyor and the total area of said air dispensing openings in the air dispensing ducts is more than 6% of the conveyor area.

10. An oven comprising: a cabinet; a cooking compartment in said cabinet; walls on said cooking compartment; support means in said cooking compartment adapted to support a food product in said compartment; plenum means in said cabinet; blower means adapted to draw air from said cooking compartment aqnd to deliver air into said plenum means; upper and lower air dispensing ducts communicating with said plenum means on opposite sides of said support means for dispensing air toward opposite upper and lower surfaces of a food product on said support means; a plurality of dampers movably secured between said plenum means and each of said air dispensing ducts, each of said dampers being arranged to adjust air flow from said plenum means into said upper and lower dispensing ducts; and control means associated with each of said dampers to independently move said dampers to adjust the sequence and intensity of air flow to upper and lower surfaces of a food product on said support means.

11. An oven according to claim 10, said plenum means comprising: first and second plenums in said cabinet; and with the addition of a gate adapted to divide air flow from said blower means into said first and second plenums.

12. An oven according to claim 11, wherein said air dispensing ducts have openings formed therein through which air is dispensed toward said support means, the sum of the area of said openings in said air dispensing ducts being equal to more than 6% of the total area of said support means upon which air is dispensed from said air dispensing ducts.

13. An oven according to claim 12, with the addition of a pair of air flow sensors in each of said plenums, said air flow sensors being positioned to indicate flow rate of air through said upper and lower air dispensing ducts; and means associated with said air flow sensors to provide a visual indication of the relative flow rates of air through said upper and lower air dispensing ducts.

14. An oven according to claim 12, said support means being spaced from walls of said cooking compartment a distance sufficient to permit passage of air adjacent the side of said support means enroute to said blower without interfering with flow of air from said air dispensing ducts toward said support means.

15. A tunnel oven comprising: a cooking compartment; walls on said cooking compartment; a conveyor in said cooking compartment adapted to transport food through said compartment, said conveyor having upper and lower surfaces extending between spaced edges; distribution chamber spaced from said conveyor; blower means adapted to draw air from said cooking compartment and to discharge air into said air distribution chamber; first and second plenums in said cabinet adjacent one edge of said conveyor; a gate adapted to adjust air flow from said air distribution chamber into said first and second plenums; air flow sensor means in each of said plenums providing indicia indicative of air flow through each plenum; a plurality of upper and lower dispensing ducts communicating with each of said plenums on opposite sides of said conveyor for dispensing air toward upper and lower surfaces of said conveyor; hanger means in said cooking compartment; means securing said hanger means to said upper dispensing ducts; means to move said hanger means to adjust the position of said upper dispensing ducts relative to said conveyor; means heating air in said cooking compartment; and means to control humidity of air in said cooking compartment.

16. A tunnel oven comprising: a cooking compartment; walls on said cooking compartment; means to control temperature of air in said cooking compartment; a conveyor in said cooking compartment adapted to transport food through said compartment; an air distribution chamber spaced from said conveyor; blower means adapted to draw air from said cooking compartment and to discharge air into said air distribution chamber; first and second generally vertically extending plenums in said cabinet adjacent one of said walls; upper and lower air dispensing ducts; means securing said upper air dispensing duct to said first plenum and positioning said upper duct to dispense air downwardly toward said conveyor; means securing said lower air dispensing duct to said second plenum and positioning said lower air dispensing duct for dispensing air upwardly toward said conveyor; and gate means adapted to divide air flow from said distribution chamber into said first and second plenums to control the rate at which air is simultaneously dispensed from said upper and lower air dispensing ducts toward said conveyor.

17. A tunnel oven according to claim 16 with the addition of a plurality of upper air dispensing ducts; and a damper associated with each of said upper air dispensing ducts, each said damper being adapted to adjust air flow from said first plenum into each of said upper air dispensing ducts for adjusting air flow from each of said upper air dispensing ducts downwardly toward said conveyor relative to the volume of air dispensed from each of the other upper air dispensing ducts.

18. A tunnel oven according to claim 16, said means securing said upper air dispensing duct to said first plenum comprising: means securing said hanger means to said upper air dispensing ducts; and means to move said hanger means vertically relative to said conveyor to position said upper air dispensing ducts relative to the conveyor.

* * * * *

UNITED STATES PATENT AND TRADEMARK OFFICE
CERTIFICATE OF CORRECTION

PATENT NO. : 4,831,238
DATED : May 16, 1989
INVENTOR(S) : Donald P. Smith; William W. Plumb; Jarald E. High It is certified that error appears in the above-identified patent and that said Letters Patent is hereby corrected as shown below:

Col. 2, line 21, change "thereto" to read -- therein --;
Col. 4, line 14, change "cyliders" to read -- cylinders --;
Col. 4, line 32, change "24" to read -- 14 --:

Col. 6, line 25, change "said", first occurrence, to
 read -- side --;

Signed and Sealed this

Nineteenth Day of December, 1989

Attest:

JEFFREY M. SAMUELS

*Attesting Officer*     *Acting Commissioner of Patents and Trademarks*